United States Patent Office
2,786,847
Patented Mar. 26, 1957

2,786,847

2-MERCAPTO, ALKANOL PYRIDINE-N-OXIDES

Francis E. Cislak, Indianapolis, Ind., assignor to Reilly Tar & Chemical Corporation, Indianapolis, Ind., a corporation of Indiana No Drawing. Application July 23, 1956,
Serial No. 599,324

7 Claims. (Cl. 260—294.8)

This invention relates to 2-mercaptoalkanolpyridine-N-oxides and to the process of making them. More particularly, it relates to 2-mercaptoalkanolpyridine-N-oxides having the general formulae:

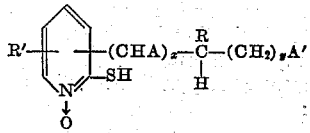

where $x$ and $y$ are 0, 1, or 2 and they may be alike or different, A and A' are either hydrogen or hydroxyl, R is hydrogen or lower alkyl, and R' is hydrogen, lower alkyl, hydroxy-lower alkyl, benzyl, or benzhydryl.

In general the compounds of my invention may be prepared by the reaction of the corresponding 2-halogeno compound with an alkali metal hydrosulfide. The equation below portrays the preparation of 2-mercapto-4-(1-propan-3-ol)pyridine-N-oxide:

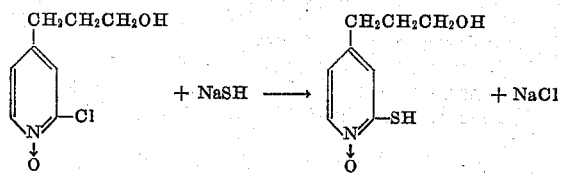

The 2-halogenolakanolpyridine-N-oxides used in my present invention are new compounds; they are described in my co-pending application Serial No. 599,321, filed even date herewith.

My invention will be described more fully in conjunction with the following specific examples. It should be understood, however, that these examples are given by way of illustration only and that the invention is not to be limited by the details set forth therein.

EXAMPLE 1

*2-mercapto-4-(1-propan-3-ol)pyridine-N-oxide*

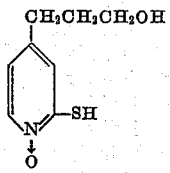

A solution of 90 grams of 2-chloro-4-(1-propan-3-ol)-pyridine-N-oxide in 500 cc. of water is placed in a two-liter flask equipped with a stirrer. The solution is heated to a temperature of about 70° C. and while stirring the solution there is added to it a solution of 50 grams of sodium hydrosulfide in 200 cc. of water. After all of the sodium hydrosulfide solution has been added, the temperature of the reaction mixture is raised to about 85° C. and the stirring and heating continued for about one-half to one hour. Then, there is added about 5 to 10 grams of decolorizing carbon, and the mixture is filtered hot. The filtrate is cooled to about 15–25° C. and made acid (pH 1.7) with hydrochloric acid. The 2-mercapto-4-(1-propan-3-ol)pyridine-N-oxide may be recovered in any convenient manner, recrystallized from hot ethanol, and dried.

In place of the sodium hydrosulfide, I can use other alkali metal hydrosulfides, or I may use alkali-metal sulfides. Or in place of using sodium hydrosulfide, I can use thiourea, thereby obtaining as an intermediate a guanyl-mercapto derivative which is converted to the 2-mercapto-4-(1-propan-3-ol)pyridine-N-oxide by hydrolysis with aqueous sodium carbonate.

EXAMPLE 2

*2-mercapto-6-(1-propan-3-ol)pyridine-N-oxide*

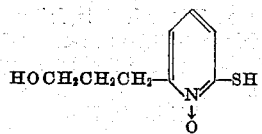

The procedure of Example 1 is followed with the exception that 2-chloro-6-(1-propan-3-ol)pyridine-N-oxide is used in place of the 2-chloro-4-(1-propan-3-ol)pyridine-N-oxide.

EXAMPLE 3

*2-mercapto-6-methanolpyridine-N-oxide*

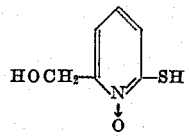

The procedure of Example 1 is followed with the exception that 2-chloro-6-methanolpyridine-N-oxide is used in place of the 2-chloro-4-(1-propan-3-ol)pyridine-N-oxide.

EXAMPLE 4

*2-mercapto-3-ethyl-6-(1-propan-3-ol)pyridine-N-oxide*

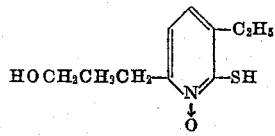

The procedure of Example 1 is repeated with the exception that 2-chloro-3-ethyl-6-(1-propan-3-ol)pyridine- N-oxide is used in place of the 2-chloro-4-(1-propan-3-ol)pyridine-N-oxide.

EXAMPLE 5

*2-mercapto-6-(1-ethan-2-ol)pyridine-N-oxide*

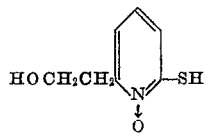

The procedure of Example 1 is repeated with the exception that 2-chloro-6-(1-ethan-2-ol)pyridine-N-oxide is used in place of the 2-chloro-4-(1-propan-3-ol)pyridine-N-oxide.

EXAMPLE 6

*2-mercapto-4-(1-propan-3-ol)-6-(1-ethan-2 - ol)pyridine-N-oxide*

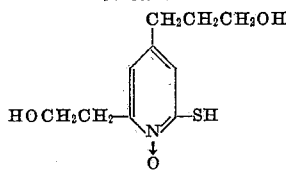

The procedure of Example 1 is repeated with the exception that 2-chloro-4-(1-propan-3-ol)-6-(1-ethan-2-ol)pyridine-N-oxide is used in place of the 2-chloro-4-(1-propan-3-ol)pyridine-N-oxide.

EXAMPLE 7

*2-mercapto-3-ethyl-6-(1-ethan-2-ol)pyridine-N-oxide*

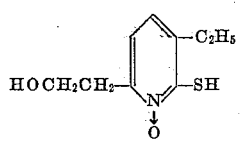

The procedure of Example I is followed with the exception that 2-chloro-3-ethyl-6-(1-ethan-2-ol)pyridine-N-oxide is used in place of the 2-chloro-4-(1-propan-3-ol)-pyridine-N-oxide.

EXAMPLE 8

*2-mercapto-6-(1-ethan-1-ol)pyridine-N-oxide*

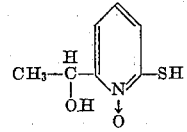

The procedure of Example 1 is followed with the exception that 2-chloro-6-(1-ethan-1-ol)pyridine-N-oxide is used in place of the 2-chloro-4-(1-propan-3-ol)pyridine-N-oxide.

The 2-mercaptoalkanolpyridine-N-oxides of my invention are alcohols and as such have the chemical properties associated with alcohols and are capable of entering into the same type of reactions as other primary alcohols. Of the many possible reactions of the alcohol group of my 2-mercaptoalkanolpyridine-N-oxides, the one of most commercial significance is that of esterification.

The 2-mercaptoalkanolpyridine-N-oxides are also mercaptans and as such have the chemical properties associated with mercaptans and are capable of forming salts by reaction with alkali metal carbonates and hydroxides and with alkaline earth metal carbonates and hydroxides. They also can form other metallic salts, such, for example, as those of zinc, mercury, iron, etc.

The 2-mercaptoalkanolpyridine-N-oxides can also form quaternary ammonium salts and amine-addition salts.

The compounds of my invention are useful as antibacterial and antifungal agents. They may be useful as fungicides and as chemotherapeutic agents.

My 2-mercaptoalkanolpyridine-N-oxides may also be used for the preparation of alkyd type polyester resins having a number of 2-mercaptopyridine-N-oxide groups in the resin molecule. Thus, the resin formed from glycerol, phthalic anhydride, and 2-mercapto-4-(1-propan-3-ol)pyridine-N-oxide may be represented as having the structure:

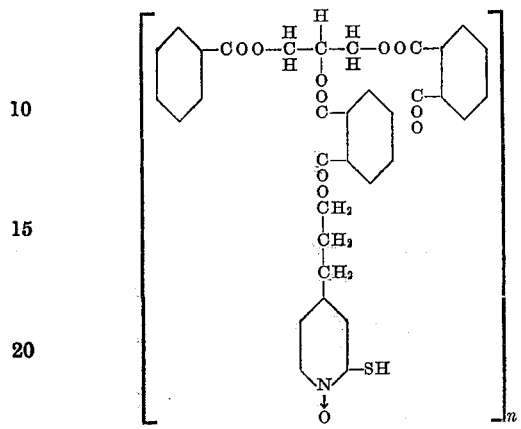

The presence of the 2-mercaptopyridine-N-oxide group in the resin molecule imparts increased resistance to mildew and other fungus attack. This resistance to fungus attack makes these resins particularly useful in the formulation of outside white paints. Similar resins made from terephthalic acid are useful in making mildew resistant fibers of the Dacron type.

The 2-mercaptoalkanolpyridine-N-oxides may be reduced to the corresponding 2-mercaptoalkanolpyridines which are useful pickling inhibitors.

I claim as my invention:

1. 2-mercaptoalkanolpyridine-N-oxides having the general formula:

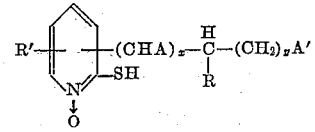

where $x$ and $y$ are integers selected from the group consisting of 0, 1, and 2, A and A' are one of the group consisting of hydrogen and hydroxyl, R is one of the group consisting of hydrogen and lower alkyl, and R' is one of the group consisting of lower alkyl, hydrogen, hydroxy-lower alkyl, and benzyl.

2. 2-mercapto-4-(1-propan-3-ol)pyridine-N-oxide.

3. 2-mercapto-6-(1-propan-3-ol)pyridine-N-oxide.

4. 2-mercapto-3-ethyl-6-(1-propan-3 - ol)pyridine - N-oxide.

5. 2-mercapto-6-methanolpyridine-N-oxide.

6. 2-mercapto-3-ethyl-6-(1 - ethan - 2 - ol)pyridine - N-oxide.

7. The process of preparing the compounds of claim 1 which comprises reacting a 2-chloro-alkanolpyridine-N-oxide of the general formula:

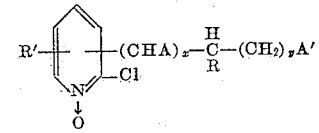

where $x$ and $y$ are integers selected from the group consisting of 0, 1, and 2, A and A' are one of the group consisting of hydrogen and hydroxyl, R is one of the group consisting of hydrogen and lower alkyl, and R' is one of the group consisting of lower alkyl, hydrogen, hydroxy-lower alkyl, and benzyl with a member of the group consisting of alkali metal hydrosulfides, alkali metal sulfides, and alkaline earth metal hydrosulfides, and recovering the 2-mercapto-alkanolpyridine-N-oxide.

No references cited.